United States Patent [19]
Nantua et al.

[11] Patent Number: 5,097,702
[45] Date of Patent: Mar. 24, 1992

[54] AUTOMOBILE WHEEL HUB

[75] Inventors: Rene Nantua, Sillingy; Roger Guers, Seynod; Fernand Peilloud, Alby-sur-Cheran, all of France

[73] Assignee: The Torrington Company, Torrington, Conn.

[21] Appl. No.: 625,693

[22] Filed: Dec. 12, 1990

Related U.S. Application Data

[60] Division of Ser. No. 488,476, Feb. 26, 1990, abandoned, which is a continuation of Ser. No. 292,850, Jan. 3, 1989, abandoned.

[30] Foreign Application Priority Data

Jan. 7, 1988 [FR] France .................. 88 00121

[51] Int. Cl.$^5$ ........................................ G01M 15/00
[52] U.S. Cl. .............................................. 73/118.1
[58] Field of Search ................ 73/118.1, 493, 494, 73/517 R, 517 A, 518, 519, 520; 310/168; 384/448, 477, 119; 324/178, 179, 173, 174

[56] References Cited

U.S. PATENT DOCUMENTS

| | | | |
|---|---|---|---|
| Re. 30,522 | 2/1981 | Gee | 310/168 |
| 3,944,864 | 3/1976 | Jovick | 310/168 |
| 3,947,712 | 3/1976 | Burckhard et al. | 310/168 |
| 4,029,180 | 6/1977 | Gee | 310/168 |
| 4,086,533 | 4/1978 | Ricouard et al. | 338/32 H |
| 4,481,440 | 11/1984 | Muller | 310/168 |
| 4,743,786 | 5/1988 | Ichikawa et al. | 310/168 |
| 4,783,180 | 11/1988 | Hayashi | 384/448 |
| 4,795,278 | 1/1989 | Hayashi | 384/448 |
| 4,850,722 | 7/1989 | Bayer | 384/448 |
| 4,864,231 | 9/1989 | Okumura et al. | 384/448 |
| 4,884,901 | 12/1989 | Hardorff | 384/448 |

FOREIGN PATENT DOCUMENTS 2756930 7/1978 Fed. Rep. of Germany ...... 310/168

Primary Examiner—Robert Raevis
Attorney, Agent, or Firm—Michael H. Minns; John C. Bigler

[57] ABSTRACT

Automobile wheel hub comprising a bearing with rolling elements in a housing in said hub and a device for sensing information, the coding element of which moves integrally with the hub and rotates in front of a stationary sensor, characterized in that the coding element is integrated into the bearing seal and that the sensing element, integral with a support which is stationary with respect to the wheel, is coaxial to the coding element in a radial position essentially equal to the value of the radius of the coding element and longitudinally shifted by a maximum value corresponding to the air gap allowed by the technology of the sensor.

3 Claims, 4 Drawing Sheets

5,097,702

AUTOMOBILE WHEEL HUB

This application is a divisional application of application Ser. No. 488,476, filed Feb. 26, 1990 which is a continuation of application Ser. No. 292,850, filed Jan. 3, 1989 (both abandoned).

The invention pertains to an automobile wheel hub comprising a roller bearing in a housing for said hub and an information sensor, the coding element of which rotates integrally with the hub and moves in front of a stationary sensor.

BACKGROUND OF THE INVENTION

French Patent No. 2,570,143 describes a hub of this type, in which the coder is fixed to the outer periphery of the hub, essentially in the plane of a raceway of the roller bearing.

When the hub is integral with a brake drum which defines, together with the outer periphery of the hub, the brake housing, the coder can no longer be placed on the hub. Moreover, when the roller bearing is a conventional roller placed in a hub attached to the steering knuckle onto which the brake plate is secured, the sensor can no longer satisfy the above-mentioned arrangement because of the small amount of space available.

The principal task of the invention is, therefore, to provide a wheel hub for drum brakes which facilitates the installation of a speed sensor with the goal of allowing, for example, the implementation of an anti-wheel locking and/or anti-skid device for vehicles equipped with drum brakes.

SUMMARY OF THE INVENTION

According to the invention, the coder is preferably integrated into the seal of the roller bearing in such a way that it is essentially flush with the plane of one lateral face of the hub facing the longitudinal plane of the vehicle; the sensor is integral with a support, which is stationary with respect to the wheel, is coaxial to the coder in a radial position essentially equal to the value of the radius of the coder element and shifted longitudinally by a maximum value corresponding to the air gap allowed by the technology of the sensor used.

BRIEF DESCRIPTION OF THE DRAWINGS

An embodiment of the hub is described below with reference to the attached drawings, in which.

In the various figures, like parts are referred to by like numbers.

DESCRIPTION OF THE PREFERRED EMBODIMENTS

Figure 1:
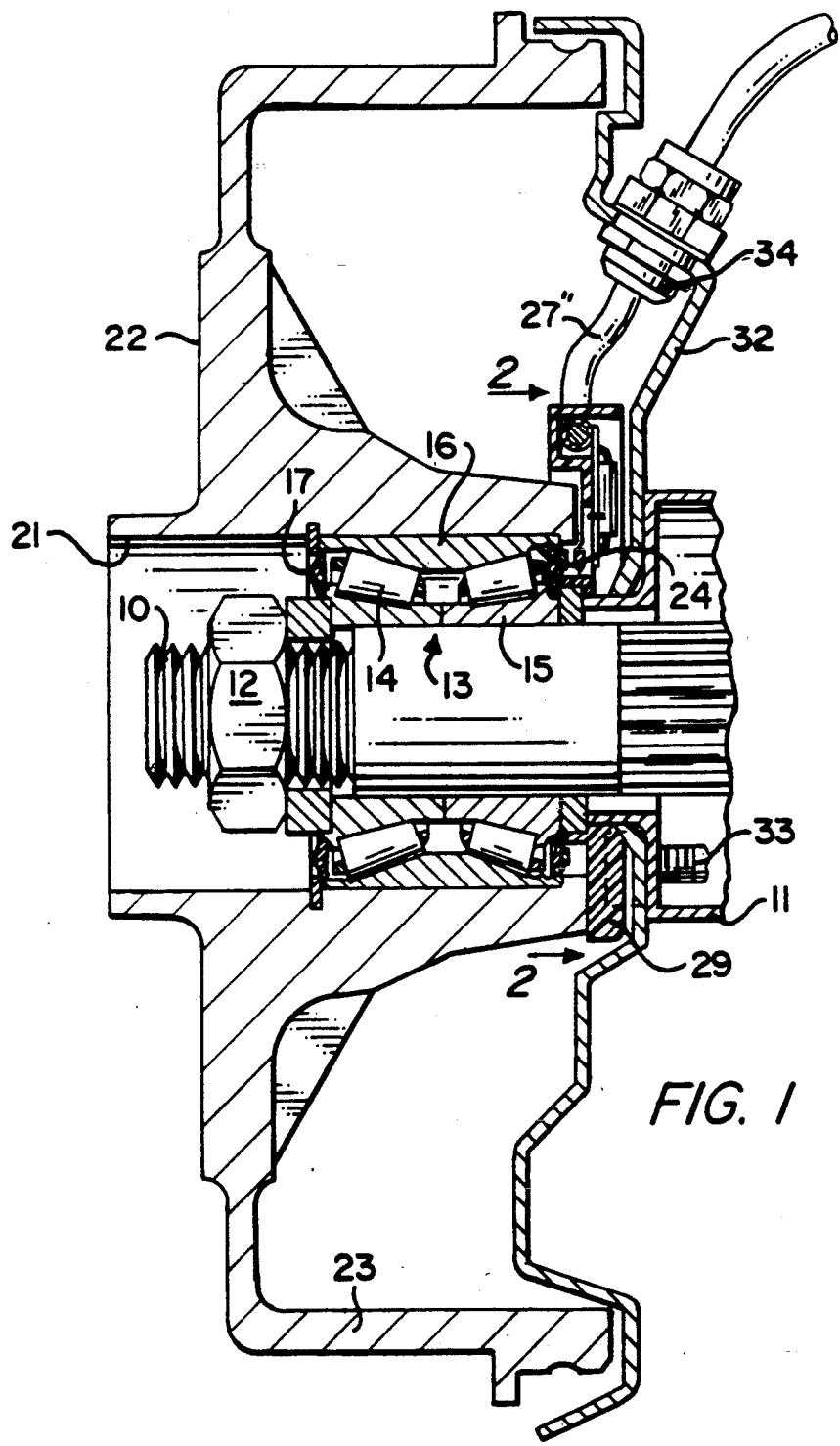
FIG. 1 is a view, partly in cross-section, taken along line 1—1 of FIG. 2 of a drum brake hub mounted on an undriven wheel spindle of an automobile.

An undriven wheel hub comprises a spindle 10 projecting from a steering knuckle 11 with, at its threaded end, a nut 12 and a washer for axially preloading a bearing 13, which can have two rows of rolling elements 14 between an inner ring 15 split into two parts and an outer ring 16, the ends of which each carry a seal 17.

Bearing 13 can consist of two conventional bearings without going beyond the context of the present invention.

Bearing 13 is placed in the bore 21 of housing 22 which extends radially into a brake drum 23, the outer face of which carries studs (not shown) for attaching the vehicle wheel Outer ring 16 of the bearing is held radially in housing 22 by clamping and held axially between a shoulder 24 on housing 22 and a retaining washer in bore 21.

Figure 3:
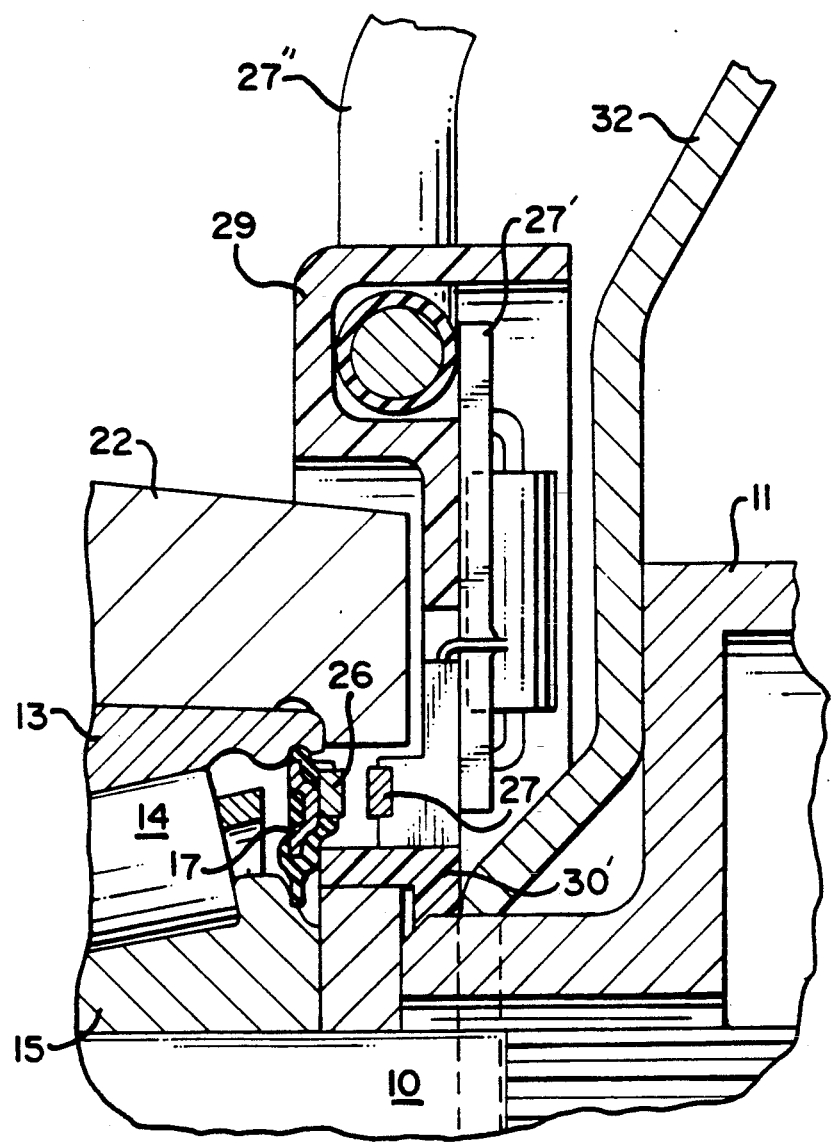
FIG. 3 is a partial view of details of the preferred embodiment of FIG. 1 on an enlarged scale.
Figure 4:
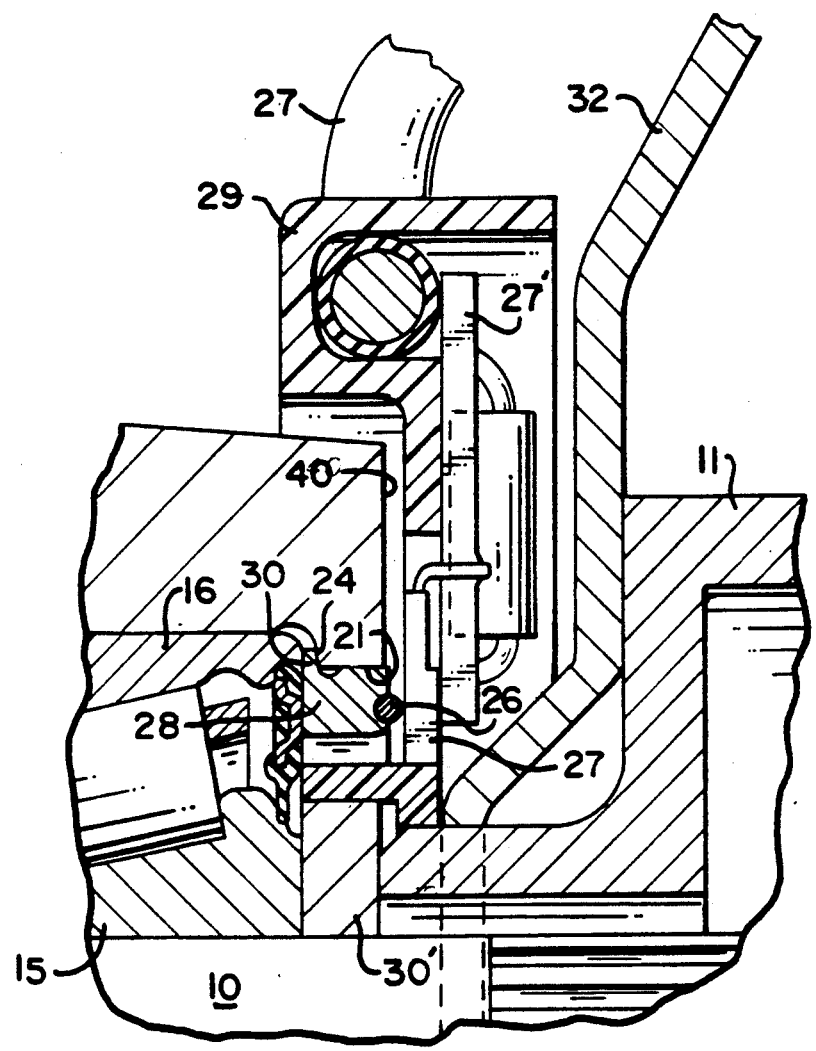
FIG. 4 is a partial detailed view on an enlarged scale of a further preferred embodiment of the invention.

Referring to FIG. 3, a device for sensing information, especially for sensing the rotational speed of the wheel consists of a coder element 26 rotating integrally with housing 22 and a stationary sensor 27. It is advantageous for coder element 26 to be integrated into seal 17 at the time the latter is molded, in such a way that it is positioned opposite the sensor. The coder element is flush with the outer lateral face of the seal. According to a variant of the invention (FIG. 4), a support 28 of coder 26 is a ring with a circular groove, in which coder 26 is housed; this support is installed in bore 21 so that the coder is essentially in the plane of lateral face 40. For this purpose, support 28 has a radial annular rim 30 clamped between an axial end of bearing ring 16 and shoulder 24.

The coder and its support can be connected by other means without going beyond the scope of the invention.

Figure 2:
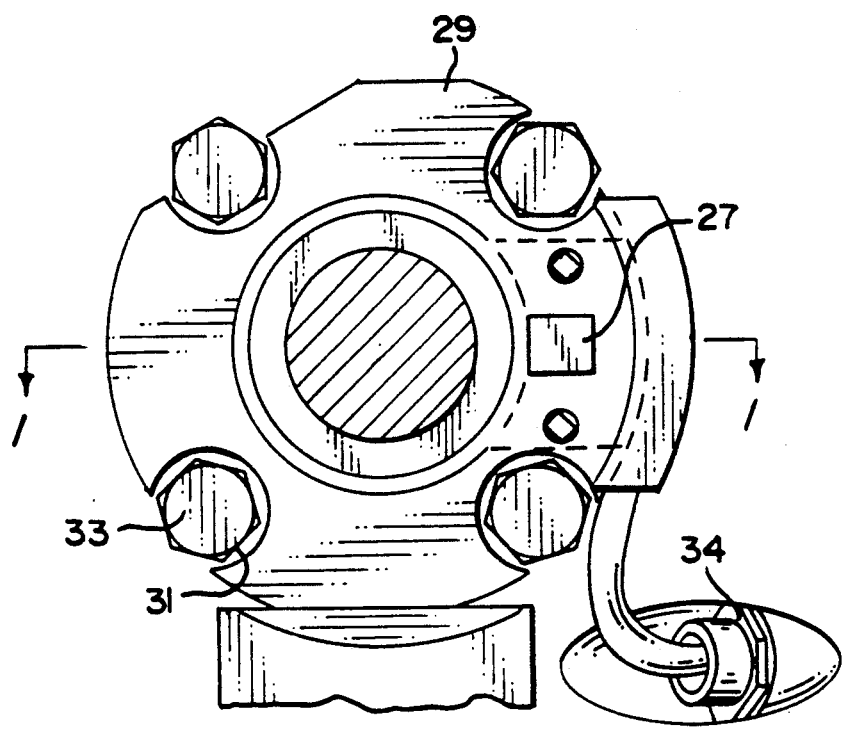
FIG. 2 is a front view of the hub along line 2—2 of FIG. 1 showing the sensor and sensor support plate.

Support 29 for sensor 27 consists of a plate, made preferably of a non-magnetic material, connected to a fixed ring 30', mounted on spindle 10 between inner ring 15 of the bearing and steering knuckle 11. Support 29 is configured in such a way as to ensure its angular position with respect to the brake plate. In the example shown in FIG. 2, support 29 has a series of recesses 31, which perform this function by interacting with attachment bolts 33 of brake plate 32. Moreover, support 29 is designed in such a way that there is only one single angular positioning possibility, namely, that which favors correct operation of sensor 27. To make it independent of the variation in the air gap between coder 26 and sensor 27 resulting from the angular camber of the wheel along its vertical plane of symmetry while passing through curves, sensor is positioned on a horizontal plane along section line 1—1 of FIG. 2.

Support 29 for sensor 27 has the additional function of carrying a printed circuit 27', comprising elements to protect sensor 27 against overvoltages and polarity reversals. It also effectively holds a cable 27'', which carries signals to the processing unit. The cable passes through brake plate 32 in cooperation with an element 34, which provides a seal against the penetration of contamination into the brake enclosure.

The invention is in no way limited to the embodiment described and represented here by way of example. In particular, the invention embraces technical means equivalent to the means described or combinations thereof to the extent that the latter are implemented in the spirit of the invention or carried out in the context of a measurement of information concerning the speed of a rotating hub.

We claim:

1. An apparatus for use with an automobile wheel comprising:
   a rotatable housing having a bore extending therethrough and having a generally horizontal axis of rotation, said rotatable housing having angular camber resulting from tilting from a vertical plane;

a coding element rotatable with the rotatable housing;

a sensor proximate the coding element, the sensor being located on a generally horizontal plane, said horizontal plane intersecting said generally horizontal axis of rotation whereby the distance between said sensor and said coding element does not vary with changes in the tilt of the rotatable housing.

2. An apparatus in accordance with claim 1 further comprising:

a bearing with rolling elements in the bore, said bearing having at least one outer race and at least one inner race to provide an outer race-inner race annulus; and a bearing seal extending across said annulus, said coding element being integrated into the bearing seal.

3. An apparatus in accordance with claim 1 wherein said coding element is located proximate the horizontal axis of rotation.

* * * * *